US011168539B2

(12) United States Patent
Tucker et al.

(10) Patent No.: US 11,168,539 B2
(45) Date of Patent: Nov. 9, 2021

(54) INTERMITTENT PRESSURE SWITCH FOR PNEUMATIC VALVES

(71) Applicants: Jeff S Tucker, Houston, TX (US); James C Cowan, Gilmer, TX (US)

(72) Inventors: Jeff S Tucker, Houston, TX (US); James C Cowan, Gilmer, TX (US)

( * ) Notice: Subject to any disclaimer, the term of this patent is extended or adjusted under 35 U.S.C. 154(b) by 0 days.

(21) Appl. No.: 16/178,152

(22) Filed: Nov. 1, 2018

(65) Prior Publication Data
US 2020/0142435 A1    May 7, 2020

(51) Int. Cl.
*E21B 34/02* (2006.01)
*G05D 16/20* (2006.01)
*H01H 35/26* (2006.01)
*E21B 47/06* (2012.01)
*H02J 7/34* (2006.01)
*H02J 7/35* (2006.01)

(52) U.S. Cl.
CPC .............. *E21B 34/02* (2013.01); *E21B 47/06* (2013.01); *G05D 16/202* (2013.01); *H01H 35/2607* (2013.01); *H02J 7/342* (2020.01); *H02J 7/35* (2013.01)

(58) Field of Classification Search
CPC .......... E21B 34/02; E21B 34/08; E21B 34/10; E21B 34/06
See application file for complete search history.

(56) References Cited

U.S. PATENT DOCUMENTS

| 2,990,852 | A | | 7/1961 | Siman | |
|---|---|---|---|---|---|
| 3,229,721 | A | | 1/1966 | Bingel | |
| 3,442,330 | A | * | 5/1969 | Cobbs | E21B 33/14 166/327 |
| 2003/0047316 | A1 | * | 3/2003 | Bosley | E21B 43/122 166/372 |

OTHER PUBLICATIONS

Turner, R.G, Analysis and Prediction of Minimum Flow Rate for the Continuous Removal of Liquids from Gas Wells, Journal of Petroleum Technology, Nov. 1969, 1475-1482, 21 (11), Society of Petroleum Engineers, USA.

* cited by examiner

*Primary Examiner* — Kristyn A Hall
(74) *Attorney, Agent, or Firm* — M. Susan Spiering; Ochoa & Associates, P.C.

(57) ABSTRACT

Disclosed is an intermittent pressure switch for pneumatic valves to control pressure relief valves in oil and gas producing operations by directing the valve to open and close based on pressure parameters (pre)set by the user. This enables oil and gas wells to produce based on formation pressure buildup. The inventive switch consists of a box containing a pressure switch programmable from 0 to 5,000 psi, a 3-port solenoid valve, 24 volt battery system, solar panel, solar control charger, pressure gauge, circuit wiring, and pressure fittings.

7 Claims, 11 Drawing Sheets

P = System pressure; HY = hysteresis; FE = window

| DIMENSION TABLE | | | | |
|---|---|---|---|---|
| PART NO. | A | B | C | D |
| AVS-311X-XXX | 88.4 [3.48] | 54.6 [2.15] | 27.0 [1.06] | 18.0 [0.71] |
| AVS-321X-XXX | 109.0 [4.29] | 66.7 [2.63] | 35.0 [1.38] | 22.0 [0.87] |
| AVS-331X-XXX | 119.8 [4.72] | 69.1 [2.72] | 40.0 [1.57] | 27.0 [1.06] |

INTERMITTENT PRESSURE SWITCH FOR PNEUMATIC VALVES

CROSS REFERENCE TO RELATED APPLICATION(S)

None.

FIELD OF THE INVENTION

The present invention relates to pneumatic valves and more particularly to intermittent opening and closing of pneumatic valves for operating wells in the oil and gas industry using a pressure switch.

BACKGROUND

Oil field pumpers ("Pumper") are individuals that operate and maintain oil and gas producing operations and the auxiliary equipment used to produce oil and gas. Their primary concern involves continued production rates of oil and gas and maintenance on the wells to make sure everything stays operating for continued production. The pumper sets the controls of the pumping system to maximize production. This job requires the pumper to set the pressure, density, rate and concentration. Pumpers set the wells to operate according to production schedules. Pumpers also separate natural gas from the oil by operating valves and compressors and concern themselves with the cost-effectiveness of the pump operation.

Currently, an oil and gas Pumper will manually open a valve to allow a well to produce until its natural pressure falls to below producible levels. The Pumper will then close the valve and allow the pressure to build on its own from the underground reservoir. This can take hours or even days depending on formation and pressures. The Pumper then returns at a later time and repeats the process; which has the well producing only when the Pumper opens the valve. This is a man-labor-intensive, manual job. It is an object to automate this role in the production of oil and gas.

A pressure switch is a form of switch that closes an electrical contact when a certain set fluid pressure has been reached on its input. The switch may be designed to make contact either on pressure rise or on pressure fall. Pressure switches are widely used in a variety of industry to automatically supervise and control systems that use pressurized fluids. Pressure switches are well known in the art.

Another type of pressure switch detects mechanical force; for example, a pressure-sensitive mat is used to automatically open doors on commercial buildings. Such sensors are also used in security alarm applications such as pressure sensitive floors.

A pressure switch for sensing fluid pressure contains a capsule, bellows, Bourdon tube, diaphragm or piston element that deforms or displaces proportionally to the applied pressure. The resulting motion is applied, either directly or through amplifying levers, to a set of switch contacts. Since pressure may be changing slowly and contacts should operate quickly, some kind of over-center mechanism such as a miniature snap-action switch is used to ensure quick operation of the contacts. One sensitive type of pressure switch uses mercury switches mounted on a Bourdon tube; the shifting weight of the mercury provides a useful over-center characteristic.

The pressure switch may be adjustable, by moving the contacts or adjusting tension in a counterbalance spring. Industrial pressure switches may have a calibrated scale and pointer to show the set point of the switch. A pressure switch will have a hysteresis, that is, a differential range around its setpoint, known as the switch's deadband, inside which small changes of pressure do not influence the state of the contacts. Some types allow adjustment of the differential.

The pressure-sensing element of a pressure switch may be arranged to respond to the difference of two pressures. Such switches are useful when the difference is significant, for example, to detect a clogged filter in a water supply system. The switches must be designed to respond only to the difference and not to false-operate for changes in the common mode pressure.

Switches designed for use in hazardous areas with flammable gas have enclosures to prevent an arc at the contacts from igniting the surrounding gas. Switch enclosures may also be required to be weatherproof, corrosion resistant, or submersible.

An electronic pressure switch incorporates some variety of pressure transducer (strain gauge, capacitive element, or other) and an internal circuit to compare the measured pressure to a set point. Such devices may provide improved repeatability, accuracy and precision over a mechanical switch.

U.S. Pat. No. 2,990,852 to Siman et al, discloses a pneumatic pressure switch for use with pressures on the order of about 500-5000 psi, and capable of controlling the flow of air in response to small changes in pressure. Disclosed is a valve for control of such movements.

U.S. Pat. No. 3,229,721 to Bingel discloses pneumatic valve construction which eliminates the need for electrical switches in fluid control applications.

In spite of much information known regarding pressure switches and pneumatic valves and their construction and use in a variety of applications, none have heretofore been used in the production of low producing oil and gas wells, and based on formation pressure of the well.

BRIEF SUMMARY OF THE INVENTION

Disclosed herein is an oilfield automation switch device based on formation pressure. It is an electronic pressure sensor, remote oilfield device, having a high/low switch, and an automated solenoid valve.

The invention is further directed to an intermittent pressure switch for pneumatic valves (hereinafter also called a pressure switch or inventive switch) that enables the valve opening process to occur multiple times per day based on set pressure formation in the well, and eliminates the human intervention factor of the customary Pumper. This in turn enables an oil or gas well to produce more oil and gas. While useful with any oil and gas well, it is well served on the low producing oil and gas wells to assist in the production process. Pressure settings for the switch are set based on a variety of factors, and the pneumatic valve will control pressure relief based on formation pressure of the well. The inventive device thus controls a pressure relief valve in oil and gas producing operations by directing a valve to open and close based on pressure parameters set by the user within the device.

The inventive device operates based on user friendly high/low pressure settings and can be used on-site or remotely. The device is equipped with I/O Link allowing users to control valves remotely via radio and cellular communications as either a stand alone unit or connected to a Supervisory Control and Data Acquisition ("SCADA") systems that monitor and control processes. The inventive device can be operated manually at the well site or remotely through a web based platform that allows control through computerized devises such as a personal computer or smartphone.

While the inventive device is disclosed herein for use in the oil/gas industry, the pressure switch can be used in multiple applications requiring or which would benefit from pneumatic valves based on pressure. Examples include but are not limited to robotics, air compressors, automotive manufacturing and the like.

DETAILED DESCRIPTION AND BEST MODE OF IMPLEMENTATION

Figure 1:
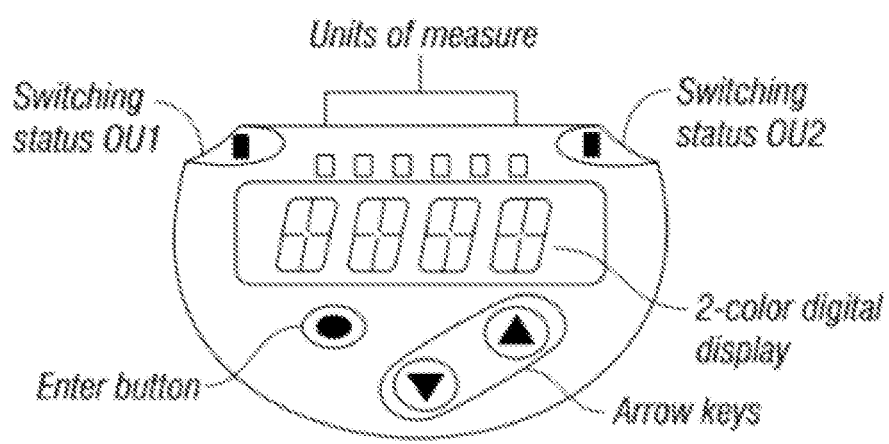
FIG. 1 illustrates a top view of the pressure switch.

Disclosed herein an intermittent pressure switch for pneumatic valves designed for use on oil and gas wells to automate the production process though pressure controlling valves that open and close. More specifically, the inventive pressure switch control box, FIGS. 4 and 10, removes the human element currently used to start and stop well operations. The pressure switch consists of a box containing a pressure switch programmable from 0 to 5,000 psi, a 3-port solenoid valve, 24 volt battery system, solar panel, solar control charger, pressure gauge, circuit wiring, and pressure fittings. See FIGS. 9 and 10.

The pressure switch of the control box is connected to a 3-port solenoid valve (1002) the control box has a pressure input (1004) and a pressure output (1006) that is actuated by the 3-port solenoid valve. The intermittent pressure switch tells the 3-port solenoid valve when to open and close. The 3-port solenoid valve is connected to the pneumatic valve on the oil or gas well. The 3-port solenoid valve tells the pneumatic valve when to open or close; which enables the flow of oil and/or gas from the well to the surface equipment used in operations. The intermittent pressure switch and the 3-port solenoid valve operate with a 24 volt battery system (see FIG. 9, 902) comprising of two (2) 12 volt batteries (904) tied together in series and a 24 volt solar panel (906) to maintain the charge of the 24 volt battery system. The control box contains a 24 volt charge controller (910) to assist in the charging of the 24 volt battery system.

The pressure switch is intermittent because it is connected to at least one 3 port solenoid which causes the valves to open and closes based on pressure formation within the well, and the preset pressure parameters set by the user. Intermittent herein means the device (pressure switch) opens and closes on its own, over time based on Pressures. Currently, there are switches that control pneumatic valves on wells based on time (for example it is set to have the well produce for 6 hrs on and 2 hrs off or as desired by the user). There are also "pressure switches" that claim to operate pneumatic valves based on pressure, but actually rely on a complex timing algorithm to simulate pressure based on time instead of actual formation pressure.

Here, the inventive device is built to react to pressure formation of the well which varies over time. The user sets the switch to turn the valves on or off, according to what pressure formation set point they believe will produce oil or gas, or pressure the well. At the point of setting the pressure settings on the switch, the users know at what pressures the wells produce oil or gas, and set the pressure switch accordingly. The user must know the pressure point for production to set the inventive switch properly; for example to set the high and low pressure parameters. If you set the well on a timer, you may not have the proper formation pressure and when the valves open/close, you may not be producing the oil/gas as efficiently as you would with pressure parameters.

An alternate embodiment of the inventive pressure switch for pneumatic valves (which open and close bidirectionally) the inventive pressure switch can be used as a safety device for the wells and the accompanying pipeline to prevent over pressuring of the pipes and equipment. The pressure settings can be placed high to serve to close the valves in the event of overpressure occurring in the well system. For example, if the pipeline can withstand 1000 psi of pressure, the inventive device is set to close the valve just before the danger pressure level is reached. When used as a safety device, one skilled in the art considers the following:

MAOP (maximum allowable operating pressure)
MAWP (maximum allowable working pressure)
MAWP must be less than MAOP.

In another embodiment, the inventive pressure switch for pneumatic valves can also be used for gas lift operations. Gas lift is a method of artificial lift that uses an external source of high-pressure gas for supplementing formation gas to lift the well fluids Currently gas lift operations typically use a one-way pilot valve that sets a desired pressure with a spring pressing on a diaphragm with a screw to tighten or loosen tension on a spring for a given relief pressure. This would actuate a pneumatic valve to open or close. This operation is cumbersome due to many factors. Examples include: methanol requirements, pilot valves are not precise, the performance of these valves change with weather conditions, and they are commonly nor repaired when needed which changes the accuracy even further. The primary limitation for gas lift operations is the lack of formation gas or an injection-gas source. Wide well spacing and lack of space for compressors on offshore platforms may also limit the application of gas lift. Poor compressor maintenance can increase compressor downtime and add to the cost of gas lift gas, especially with small field units. Compressors are expensive and must be properly maintained. Generally, gas lift is not as suitable as some other systems for single-well installations and widely spaced wells. The use of wet gas without dehydration reduces the reliability of gas lift operations. These problems are remedied with the inventive pressure switch.

In another embodiment, the inventive pressure switch for pneumatic valves can also be used for plunger lift operations. Currently, plunger lift devices use timing algorithms to simulate pressure; whereby, this inventive device uses actual formation pressure. Plunger lift has become a widely accepted and economical artificial lift alternative, especially in high-gas/liquid-ratio (GLR) gas and oil wells. Plunger lift uses a free piston that travels up and down in the well's tubing string. It minimizes liquid fallback and uses the well's energy more efficiently than does slug or bubble flow. As with other artificial lift methods, the purpose of plunger lift is to remove liquids from the wellbore so that the well can be produced at the lowest bottom hole pressures. Traditionally, plunger lift was used on oil wells as the wells started to load or as a means of gas lift assist and many early articles discussed optimization of liquid production. Plunger lift have become more common on gas wells, and papers from the 1980s onward have focused on this aspect.

As gas rates and velocities continue to drop, the effect of gravity on the liquids becomes more apparent. Liquids on the tubing walls that were moving upward begin to stall, and gas slips through the center of the liquid. When enough liquids stall, liquid "slugs" are formed that inhibit gas flow. The well begins a cyclic process of unloading liquids that commonly is referred to as "heading" or "slugging." Liquid collects on the tubing walls, increases hydrostatic backpressure, restricts gas flow, and further decreases gas velocity.

In a short period of time, the reservoir might build sufficient gas pressure under the liquid slugs to overcome the hydrostatic pressure and force the slug back up the tubing. This gas expands, partially carrying liquid, partially slipping through the liquid. Much of the liquid is carried out of the wellbore, and the well flows at higher rates because of a decrease in hydrostatic pressures. Eventually, the liquid left behind in the tubing and the new liquid from the reservoir form slugs, and the process repeats.

According to the Turner et al. 1 critical-flow-rate correlation (Fig. A), a well that produces gas and water in 2⅜-in. [1.995-in. inner diameter (ID)] tubing to a 100-psia surface pressure requires approximately a 320 Mscf/D flow rate to prevent fallback and unload liquids. Below this rate, liquid fallback will occur and liquids will not be removed adequately. The same well with a reservoir pressure of 500 psia only requires a water column of 800 to 1,000 ft to shut off flow completely. That hydrostatic pressure is equivalent to <4 bbl of water in 2⅜-in. tubing. So, below critical flow rates, a very small amount of liquid can limit production severely.

An additional embodiment involves using the pressure switch for a gas well which is producing gas from tubing and casing alternately. Each of these operations can occur independently and an independent pressure switch is used.

The pressure switch and box (also called herein control box or housing unit) is placed on or near the well head and in close proximity to the pneumatic valve. It is installed using brackets and clamps that can be attached directly to existing piping around the well head. At this time, one pressure switch is used per application. Hence if it is desired to use the pressure switch to react to pressure formation of the well and also as a safety device, it is recommended to use two pressure switches. However, one of skill in the art can envision and adapt the switch to operate 2 or more applications.

FIG. 1 illustrates a perspective view of the pressure switch. 100 illustrates the top view of the inventive pressure switch showing the location for the units of measure (102), the switching status OU2 (104), the 2-color digital display (106), the arrow keys (108), the enter button (110), and the switching status OU1 (112). The switching status shows whether the pneumatic valve is either in the open or closed position. Switching status OU1 and OU2 differentiate whether the pneumatic valve is in the normally open or normally closed position. Normally pneumatic valves have to be mechanically changed to either normally open or normally close. The intermittent pressure switch has a setting to make the change within the pressure switch allowing it to operate a valve that it set up in either position. The 2-color display either shows the pressure value in red or green depending on user setup preference.

The pressure switch displays the current formation pressure and whether the pneumatic valve is open or closed. It generates output signals according to the operating mode and the parameter setting. It provides the process data via IO-link. The pressure switch is capable of bidirectional communication, meaning it receives and sends out data and allowing the following options to a user:

Remote display—reading and display of the current well system pressure;

Remote parameter setting—reading and changing the current parameter setting;

IO-link—parameter setting meaning that the switch will interface with an IO link capable module for operation. The IO link interface enables direct access to the process and diagnostic data and provides the possibility to set the parameters of the unit during operation. In addition, communication is possible via a point-to-point connection using a USB adapter cable. The pressure switch will operate with hardware and software as described and available at http//www.wellmonkey.com, herein incorporated by reference.

During manual operation of the inventive pressure switch the programming mode comprises the following steps:
1. Press Enter [●] to access parameter selection menu
2. Press Up/Down [▲] [▼] Arrow Until desired menu item is displayed.
    (See Pressure Sensor Menu Items).
3. Press Enter [●] to display the current setting.
4. To change the setting, press and hold the up [▲] or down [▼] arrow for 1 second until the flashing value is continuously incremented.
    After this time, the switch point may be increased continuously (by holding down the up or down arrow) or incremented (by pressing and releasing the arrows repeatedly) until the desired value is reached.
5. Press Enter [●] a once to save the desired value.
6. The desired value is set. If no button is pressed for 30 seconds, the sensor returns to the operating mode.
7. Repeat these steps to set other values as required or desired.

The pressure sensor menu items include at least a setpoint, output 1 and 2, hysteresis and field mode data, unit selection, PNP, NPN, color display options, timing for display (ie., 50, 200 or 600 ms). These items can be modified as desired by those of skill in the art.

The inventive pressure switch will be described relative to the housing unit or box it resides in and the components therein. Also the description will be based on looking at the box and what parts are on the front, left, and right side of the box.

Figure 2:
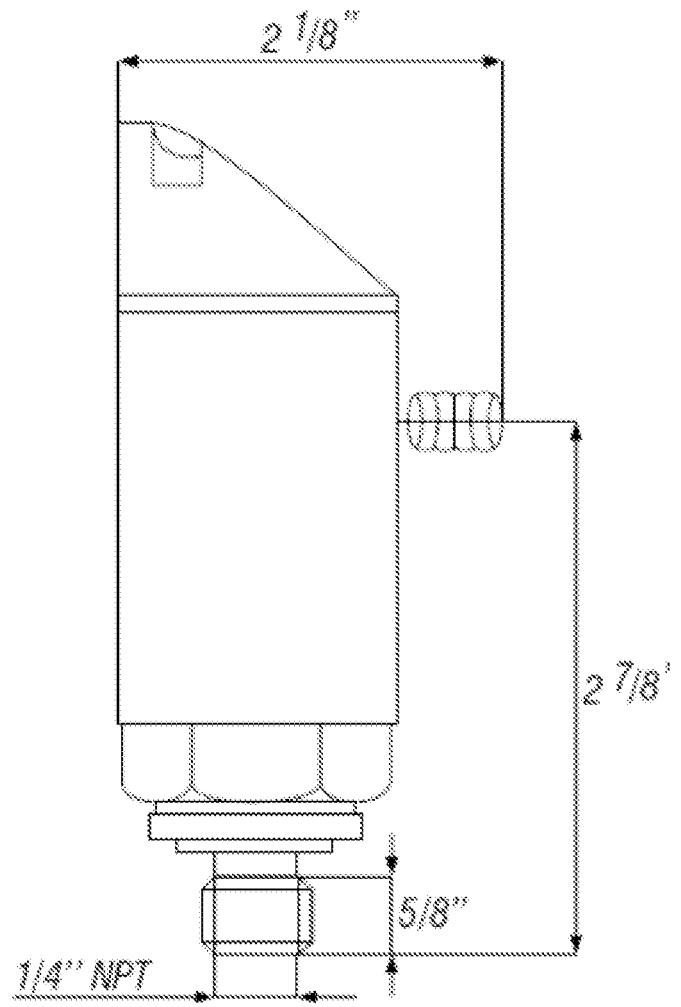
FIG. 2 illustrates a side view of the pressure switch.
Figure 3:
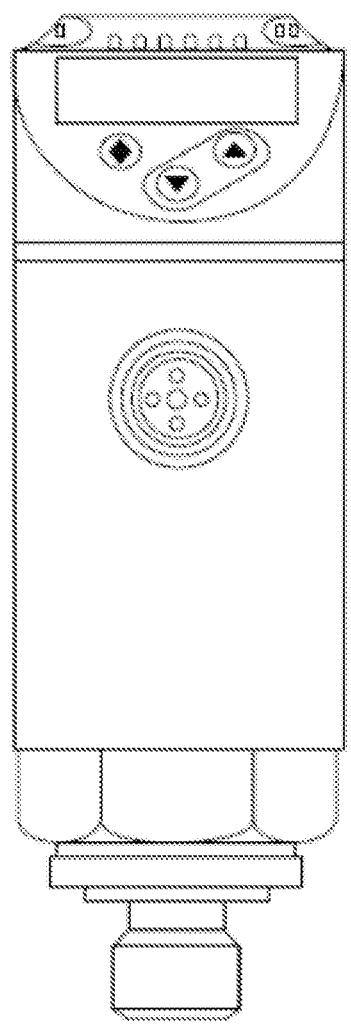
FIG. 3 illustrates a front view of the pressure switch having a connector valve.
Figure 4:
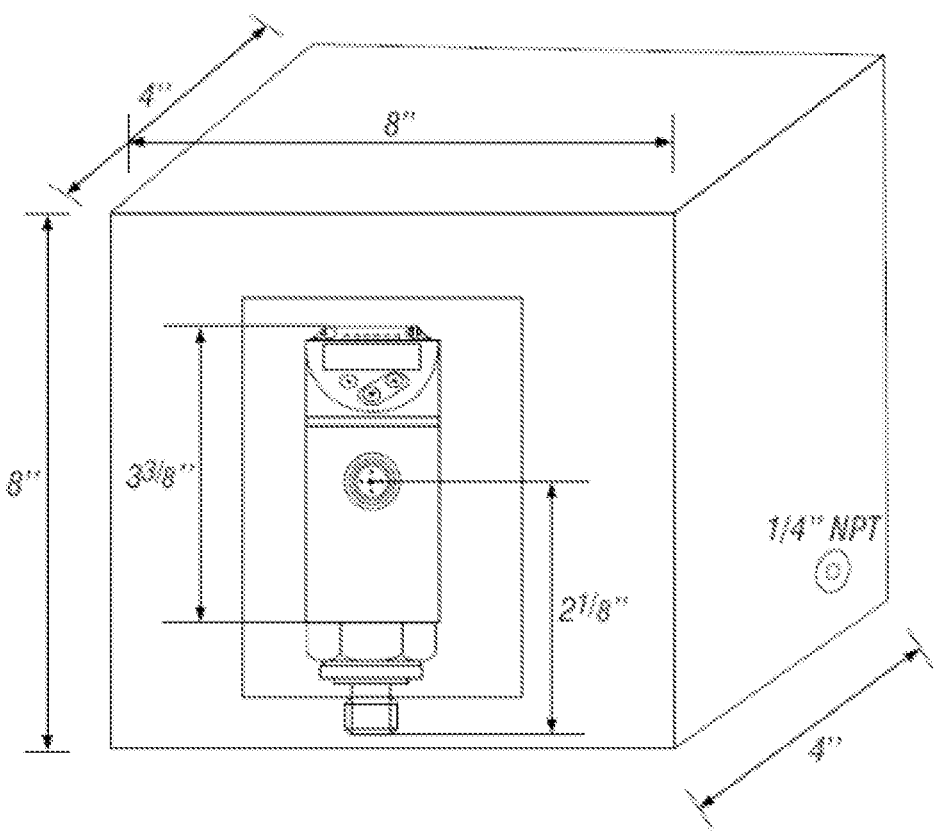
FIG. 4 illustrates a front and right side view of the pressure switch within a box.

FIG. 2 illustrates a side view of the pressure switch. FIG. 3 illustrates a front view of the pressure switch. FIG. 4 illustrates a front and right side view of the pressure switch within the housing box. The inventive pressure switch consists of a box containing a pressure switch, a 3-port solenoid, 24 volt battery system, solar panel, solar control charger, pressure gauge, wiring block and wiring, and pressure fittings. The front of the control box has a small enclosure that contains the intermittent pressure switch. The right side of the control box has a ¼" National Pipe Thread ("NPT") with a ¼" push-to-connect fitting for ¼" poly tubing that is connected from the output port on the 3-port solenoid valve inside the box directly to a ¼" push-to-connect fitting that is installed on the pneumatic valve of the well. The 3-port solenoid valve and the solar charge controller are located inside the box along with wiring and a terminal connector for the wiring. The solar panel and batteries are located outside the box.

Figure 5:
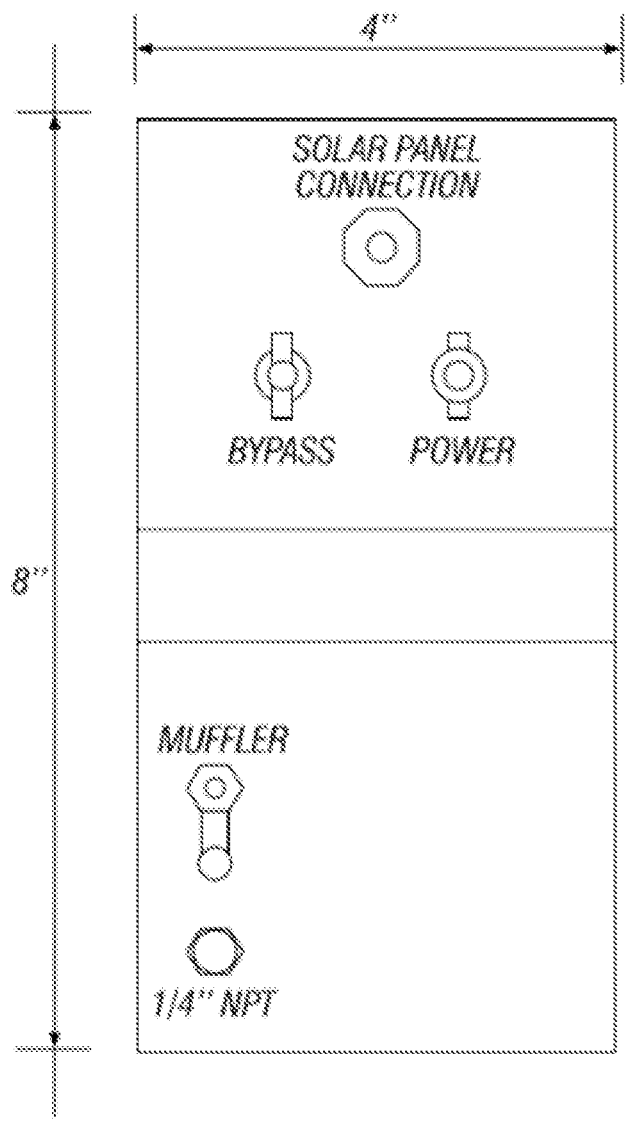
FIG. 5 illustrates a left side view of the pressure switch box with connections.

FIG. 5 illustrates a left side view of the pressure switch housing box with connections. The left side of the box contains a cord grabber (502) where the 24-volt solar panel wiring connects to the solar charge controller within the box, a bypass switch (504), power switch (506), an Exhaust Silencer (or muffler (508)), and a ¼" NPT (510) with a ¼" push-to-connect fitting for ¼" poly tubing. A standard, commercially available, 24-volt, 20 watt solar panel is used to charge the batteries. The solar panel connects through the cord grabber labeled "Solar Panel Connection" at the top middle of the left side of the box. The "Bypass" and "Power" switches are standard commercially available toggle switches. The "Bypass" switch enables the user to manually bypass the intermittent pressure switch and operate the pneumatic valve in the open position continuously. The "Power" switch provides power to the whole unit. If the "Power" switch is switched to the off position, the intermittent pressure switch will be off and the pneumatic valve will default to the closed position. The "Exhaust Silencer" (508) is connected directly to the 3-port solenoid valve inside the box and is used to expel trapped gas within the 3-port solenoid valve and tubing when switching between open and closed positions. The solenoid valve is not shown within this figure. The ¼" NPT (510) connection on the left side of the box is the "Input" that is from a regulator on the well head to the 3-port solenoid valve within the box.

Figure 6A:
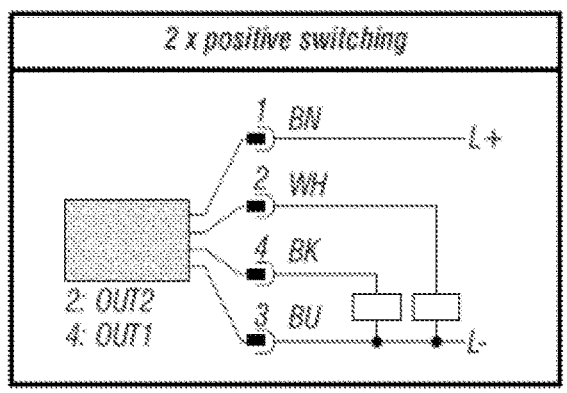
FIGS. 6A and 6B illustrate sample circuits of the pressure switch.
Figure 6B:
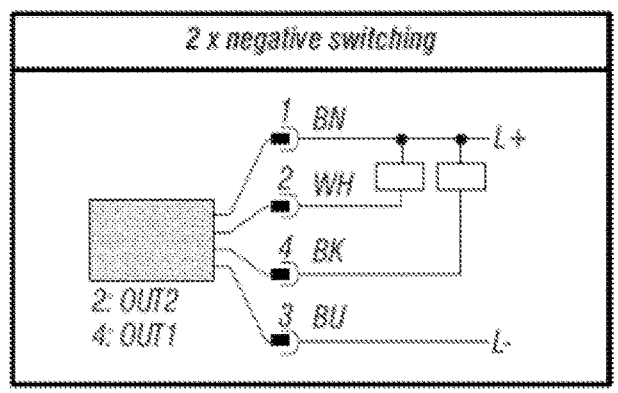

FIGS. 6A and 6B illustrate sample circuits of the pressure switch. The switch can be wired for positive or negative switching differentiating whether a pneumatic valve is set up in the normally open or normally closed position. Changes to the settings can also adjust the way intermittent pressure switch controls a pneumatic valve that is either normally open or normally closed.

Figure 7:
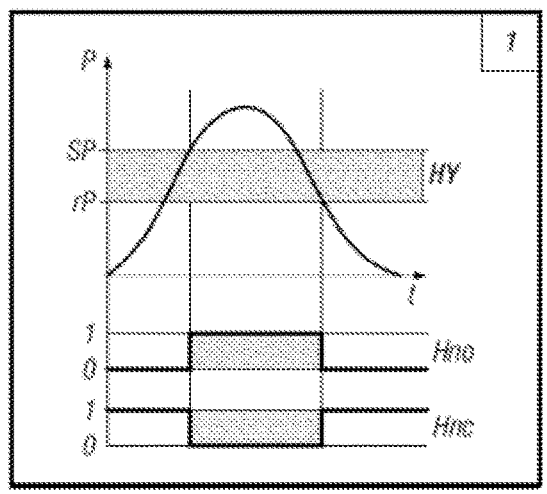
FIG. 7 illustrates a hysteresis switching function for the pressure switch.
Figure 7:
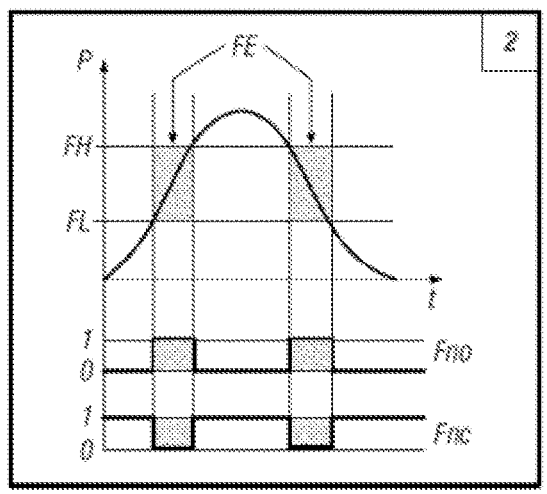

FIG. 7 illustrates a hysteresis switching function for the pressure switch. 1) shows the setting where the pneumatic valve is open between and low and a high pressure setting and 2) shows the setting where the pneumatic valve is open below a low pressure or above a high pressure.

Figure 8:
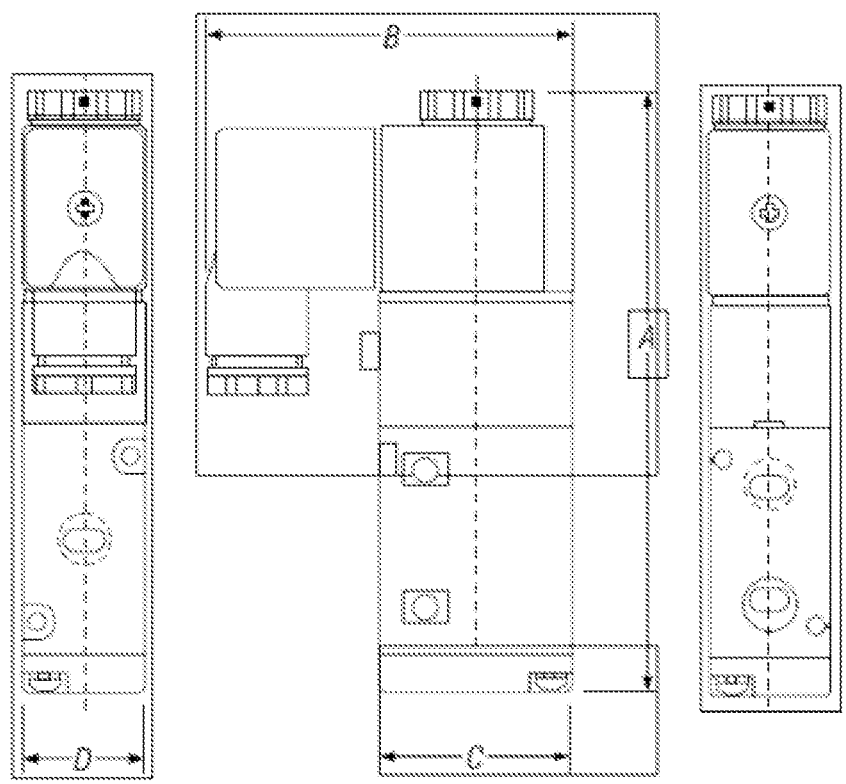
FIG. 8 illustrates the 3-port solenoid valve.

FIG. 8 illustrates the 3-port solenoid valve and has a dimension table therefor. For the present application as a pressure switch for pneumatic valves, a commercially available solenoid valve was used and purchased from Automation Direct.

Figure 9:
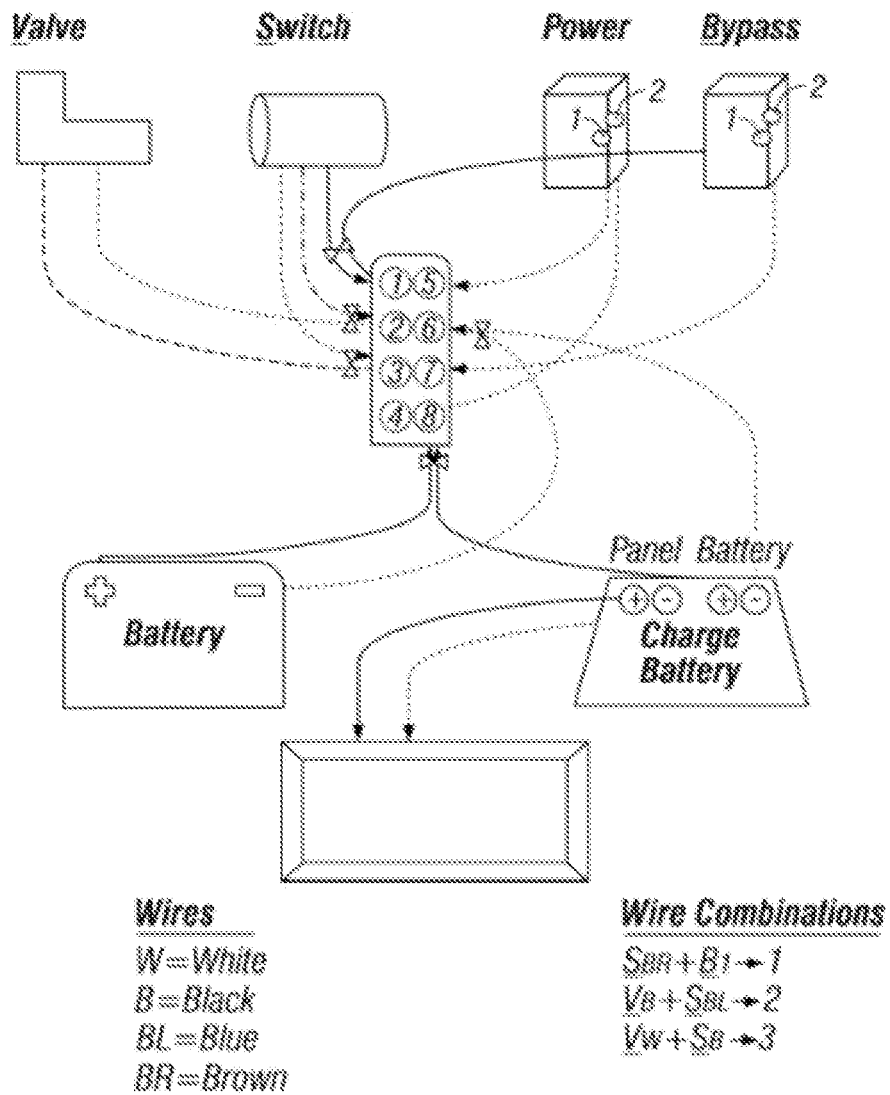
FIG. 9 illustrates a alternate wiring schematic for the pressure switch.

FIG. 9 illustrates a wiring schematic or embodiment for the pressure switch illustrating the connections between the solenoid valve (904), the pressure switch (906), the power (908) and the bypass (910) operations as they connect to the wiring terminal block (902) and the battery (912) and the charge controller (914). The charge controller (914) is connected to a solar panel (916). The wire combinations are explained with S=switch; V=valve; B=bypass; B=Black colored wires; BL=blue colored wires; and BR=brown colored wires. The combinations may be: wires $S_{BR}+B_1$ (connected to terminal 1), $V_B+S_{B1}$ (connected to terminal 2), and $V+S_B$ (connected to terminal 3). Those of skill in the art will recognize the connection diagram and that specific wires must be connected in proper order for the intermittent operation to work with the pneumatic valves.

Figure 10:
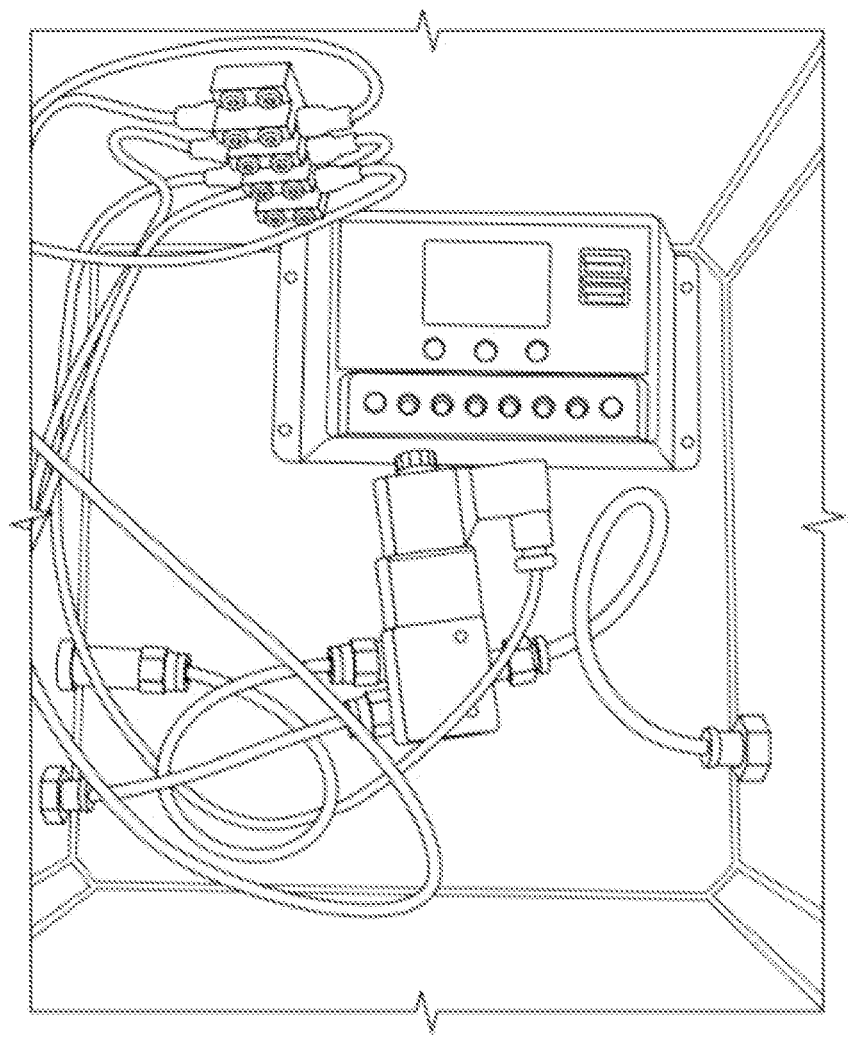
FIG. 10 illustrates an alternate view of the pressure switch.

FIG. 10 illustrates an embodiment of the housing and pressure switch. Shown in FIG. 10 is an installed intermittent pressure switch wherein the 3-port solenoid valve (1002) is shown connected to the input port (510), which is suggested to remain at or less than 80 psi, the exhaust silencer (508), and the output (1004) which connects the solenoid to the pneumatic valve of the wellhead. Also shown is the terminal box (902). Not shown but within the structure are the 2 bypass and power switches for the unit. Shown in the upper right portion of the FIG. 10 is the solar charge controller (914).

Figure 11:
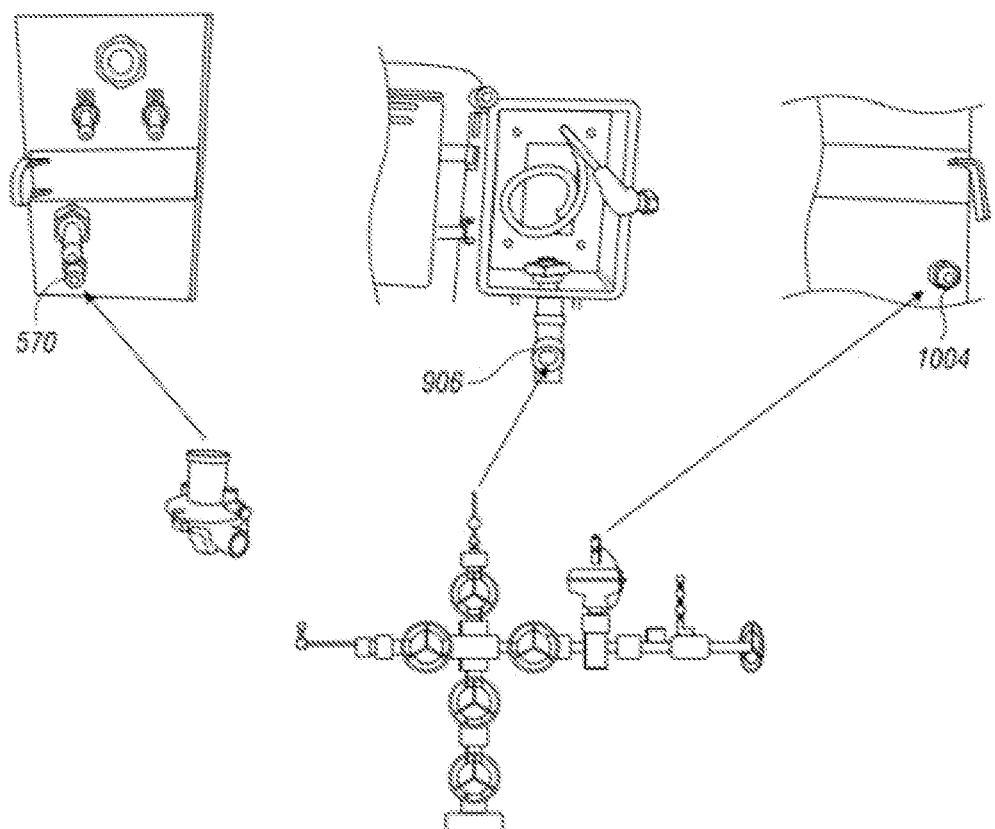
FIG. 11 illustrates the pressure switch connected to an oil well pneumatic valve.
Figure 12:
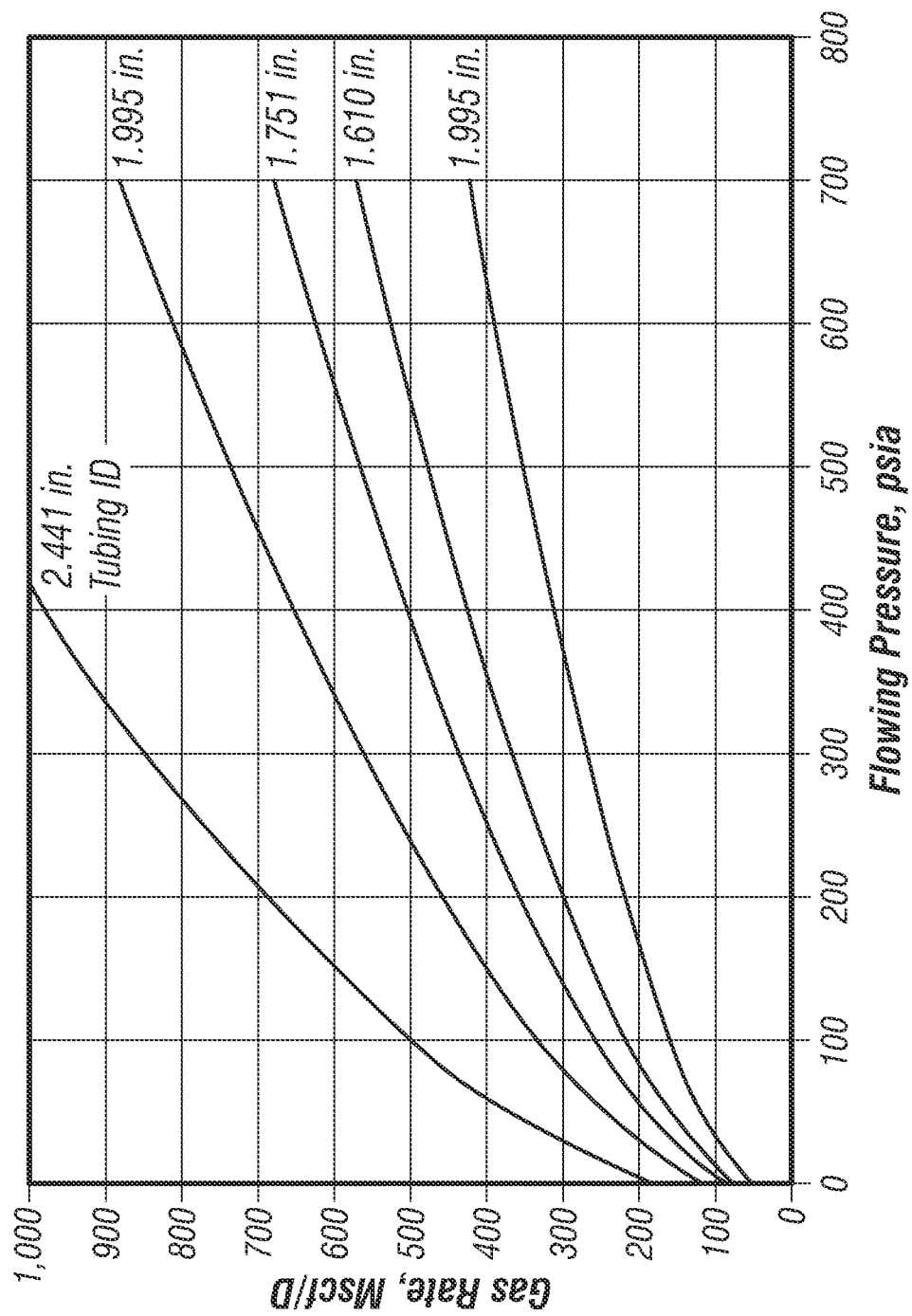
FIG. 12 illustrates critical flow rate correlation for various sizes of tubing.

FIG. 11 illustrates an installation diagram for the pressure switch connected to an oil well pneumatic valve on a wellhead. The input (510) is shown on the left side of FIG. 11, while the supply output (1004) is shown on the right side of FIG. 10. The pneumatic valve of the wellhead is connected to the output (1004) portion of the pressure switch and the input (510) is connected to a regulator, while the well is connected to the switch (906). Input (510) is attached to a regulator using ¼" nylon tubing. Switch (906) is attached to the manifold utilizing a standard production line, and output (1004) is attached to the pneumatic valve (connected to a manifold and wellhead) with ¼" nylon tubing.

Currently, oil and gas operators can install automated valves, any of these current systems are based on time settings instead of pressure settings, and are costly items to purchase and install. Current existing switches are used as components of other automated processes; where the present inventive pressure switch is a standalone devise and is a cost effective solution for oil and gas operations. It is also a cost effective solution for other applications as discussed above.

Example

The Intermittent Pressure Switch was installed in the field on gas wells for three examples:
1) production between a low and a high pressure set point;
2) as a safety device for high/low pressure set points to close the pneumatic valve if pressure dropped down to a set low or went above a set high; and
3) set up to operate in a gas lift operation whereby the switch would open a downstream valve to inject gas down a well to gas lift valves.

Example 1: The Intermittent Pressure Switch was installed on two gas wells that were remote and were not producing because a Pumper could not get to them. Production went from 0 million cubic feet per day of gas ("MCFD") to 10 MCFD for each well. The Intermittent Pressure Switch was then installed on 10 gas wells with the following before and after MCFD results:

| INTERMITTENT PRESSURE SWITCH TEST | | |
|---|---|---|
| | AVE MCFD | |
| | BEFORE | AFTER |
| WELL 1 | 40 | 43 |
| WELL 2 | 38 | 42 |
| WELL 3 | 2 | 4 |
| WELL 4 | 49 | 54 |
| WELL 5 | 8 | 30 |
| WELL 6 | 15 | 51 |
| WELL 7 | 10 | 36 |
| WELL 8 | 38 | 50 |

-continued

| INTERMITTENT PRESSURE SWITCH TEST | | |
|---|---|---|
| | AVE MCFD | |
| | BEFORE | AFTER |
| WELL 9 | 12 | 32 |
| WELL 10 | 6 | 18 |
| TOTAL | 218 | 360 |

It can be seen that all 10 wells studied improved their respective production once the inventive pressure switch was installed and operational. Percent increases were seen from 7% (well 1) to 73% (well 5) in production when the pneumatic valves were opening and closing based on formation pressure of the respective valve. The inventive device can help low producing wells increase their production by manipulating the opening and closing of valves based on formation pressure by about 5%-100% increase, preferably about 25-75% increase. The inventive switch will not produce more oil or gas, but merely make the currently low producing, low efficient wells more productive.

This automated process reduces man hours needed to manually operate the valve; which allows personnel to focus on other aspects of operations. Wells need to maintain a minimum production level to be considered a commercially viable well. This device helps wells to produce over the minimum level to be commercially viable.

Example 2 was installed on several of the above wells as over and under pressure control. Over pressure to protect downstream pipeline from pressuring over the certified pressure ratings and under pressure control to prevent pressure from dropping low enough to kill a downstream compressor. The pressure switch operated as expected to open or close the valves consistently.

Example 3 was installed on 3 gas lift wells that have downhole gas lift valves that open at specific pressures. The inventive pressure switch was set to allow the line to build to the specific pressure that would enable the downhole valve to open and operated as expected in the 3 gas wells.

The invention claimed is:

1. A housing unit comprising an intermittent pressure switch for a pneumatic valve contained on an oil or gas wellhead, said housing unit further comprising:
the pressure switch programmable from 0 to 5,000 psi,
at least one 3-port solenoid valve capable of responding to changes in pressures from 0 to 5000 psi having an inlet, an outlet, and a passageway for fluid or gas flow communication between the inlet and the outlet;
a 24 volt battery system for providing charge to the pressure switch,
a pressure gauge for measuring the pressure at the inlet and the outlet,
a wiring terminal for circuit wiring, and
at least two pressure fittings,
and connected to the pneumatic valve housed in the housing unit, wherein the pneumatic valve is configured to open or close in response to preset formation pressure settings.

2. The housing unit of claim 1 wherein two pressure switches are placed on the wellhead.

3. The housing unit of claim 1 wherein the pressure switch operates in a bidirectional mode.

4. The housing unit of claim 1 wherein the pressure switch is connected to a plunger lift operation.

5. The housing unit of claim 1 wherein a solar panel is contained on an oil or gas wellhead for providing backup charge to the battery system.

6. A housing unit comprising an intermittent pressure switch for a pneumatic valve contained near a wellhead, said housing unit further comprising:
the pressure switch programmable from 0 to 5,000 psi,
at least one 3-port solenoid valve capable of responding to changes in pressures from 0 to 5000 psi having an inlet, an outlet, and a passageway for fluid or gas flow communication between the inlet and the outlet;
a 24 volt battery system for providing charge to the switch,
a solar panel contained on an oil or gas wellhead for providing backup charge to the battery system,
a pressure gauge for measuring the pressure at the inlet and the outlet,
a wiring terminal for circuit wiring, and
at least two pressure fittings,
and connected to the pneumatic valve housed in the housing unit wherein the pneumatic valve is configured to open or close in response to preset formation pressure settings.

7. The housing unit of claim 6 wherein two pressure switches are placed near the wellhead.

* * * * *